(12) United States Patent
Yao et al.

(10) Patent No.: US 11,595,116 B2
(45) Date of Patent: Feb. 28, 2023

(54) SYSTEM WITH MODULATED SIGNAL TO COMPENSATE FREQUENCY ERRORS IN LTE SIGNALS

(71) Applicant: AST & Science, LLC, Miami, FL (US)

(72) Inventors: Huiwen Yao, Potomac, MD (US); Praveen Kumar Tangutoori, Telangana (IN)

(73) Assignee: AST & Science, LLC, Miami, FL (US)

( * ) Notice: Subject to any disclaimer, the term of this patent is extended or adjusted under 35 U.S.C. 154(b) by 0 days.

(21) Appl. No.: 16/953,428

(22) Filed: Nov. 20, 2020

(65) Prior Publication Data

US 2021/0218464 A1 Jul. 15, 2021

Related U.S. Application Data

(60) Provisional application No. 63/033,087, filed on Jun. 1, 2020.

(30) Foreign Application Priority Data

Jan. 15, 2020 (IN) .............................. 202011001814

(51) Int. Cl.
*H04B 7/185* (2006.01)
*H04W 56/00* (2009.01)
*H04B 7/195* (2006.01)

(52) U.S. Cl.
CPC .......... *H04B 7/1858* (2013.01); *H04B 7/195* (2013.01); *H04W 56/005* (2013.01); *H04W 56/0035* (2013.01)

(58) Field of Classification Search
CPC . H04B 7/1858; H04B 7/195; H04W 56/0035; H04W 56/005
See application file for complete search history.

(56) References Cited

U.S. PATENT DOCUMENTS

| | | | | |
|---|---|---|---|---|
| 6,058,306 | A * | 5/2000 | Liu | H04B 7/208 342/357.29 |
| 8,416,759 | B1 * | 4/2013 | Narasimhan | H04W 56/0035 370/344 |
| 9,973,266 | B1 | 5/2018 | Avellan et al. | |
| 10,454,533 | B1 * | 10/2019 | Kogiantis | H04B 7/01 |
| 2005/0125176 | A1 * | 6/2005 | Makhlouf | H04L 27/2657 702/69 |

(Continued)

FOREIGN PATENT DOCUMENTS

| EP | 2315366 A1 | 4/2011 |
|---|---|---|
| WO | WO-2016/195813 A2 | 12/2016 |

OTHER PUBLICATIONS

International Search Report & Written Opinion for PCT/US2020/061532, dated Mar. 17, 2021, 15 pgs.

*Primary Examiner* — Huy D Vu
*Assistant Examiner* — Bailor C Hsu
(74) *Attorney, Agent, or Firm* — Botos Churchill IP Law

(57) ABSTRACT

A satellite communication system leverages the carrier offset detection capability of the demodulator contained in an on-board modem of M&C channel. The modem detects the frequency error Δf, introduced in the signal path from the output of the base station at ground to the output of baseband conversion on the satellite, by analyzing the baseband signal at the baseband conversion to estimate the received carrier f'c and subtracting it the from the expected frequency (fc).

22 Claims, 4 Drawing Sheets

(56) References Cited

U.S. PATENT DOCUMENTS

| | | | |
|---|---|---|---|
| 2008/0056305 A1 | 3/2008 | Medvedev et al. | |
| 2008/0180321 A1* | 7/2008 | Wang | G01S 19/29 |
| | | | 375/E1.003 |
| 2009/0268828 A1* | 10/2009 | Roberts | H04L 27/2657 |
| | | | 455/517 |
| 2009/0312056 A1* | 12/2009 | Drugge | H04L 27/0014 |
| | | | 455/561 |
| 2010/0128829 A1* | 5/2010 | Drugge | H04L 27/0014 |
| | | | 375/354 |
| 2010/0226416 A1* | 9/2010 | Dent | H04L 25/0242 |
| | | | 375/296 |
| 2013/0040684 A1* | 2/2013 | Yu | H04B 7/0617 |
| | | | 455/517 |
| 2013/0143503 A1* | 6/2013 | Li | H04W 36/0058 |
| | | | 455/63.1 |
| 2013/0293414 A1* | 11/2013 | Robinson | G01S 19/08 |
| | | | 342/357.25 |
| 2014/0301303 A1* | 10/2014 | Roman | H04L 5/0073 |
| | | | 370/329 |
| 2017/0033904 A1* | 2/2017 | Stirling-Gallacher | |
| | | | H04L 5/0048 |
| 2017/0272131 A1* | 9/2017 | Ananth | H04W 72/082 |
| 2018/0295596 A1* | 10/2018 | Zhang | H04W 56/0035 |
| 2018/0330611 A1* | 11/2018 | Jiang | G08G 1/22 |
| 2019/0052443 A1* | 2/2019 | Cheng | H04L 27/2613 |
| 2019/0238216 A1 | 8/2019 | Avellan et al. | |

\* cited by examiner

SYSTEM WITH MODULATED SIGNAL TO COMPENSATE FREQUENCY ERRORS IN LTE SIGNALS

RELATED APPLICATIONS

This application claims the benefit of priority of Indian Patent Application No. 202011001814, filed Jan. 15, 2020, and U.S. Provisional Application No. 63/033,087, filed Jun. 1, 2020. The contents of those applications are relied upon and incorporated herein by reference in its entirety.

BACKGROUND

U.S. Pat. No. 9,973,266 shows a system for assembling a large number of small satellite antenna assemblies in space to form a large array. The entire content of the '266 patent is incorporated herein by reference. As disclosed in the '266 Patent, FIGS. 1(a), 1(b) show a satellite communication system 100 having an array 300 of small satellites 302 and a central or control satellite 200. The small satellites 302 communicate with end users 500 within a footprint 400 on Earth, and also communicate with the control satellite 200, which in turn communicates with a gateway 600 at a base station. The small satellites 302 can each include, for example, a processing device (e.g., a processor or controller) and one or more antenna elements. And the control satellite 200 can include a processing device and one or more antenna or antenna elements.

Terrestrial mobile phone base stations must comply with the current specification, for e.g. 3GPP TS 36.104 V12.10.0 (2016-01), regarding radio transmission and reception. Among other things, the specification mentions frequency accuracy and stability requirements of signal transmitted from the base station. The terrestrial base stations can comply with the requirement by using highly accurate and stable clock sources.

To provide economically efficient connectivity to thinly populated remote areas or ships in open seas, earth station equipment (see FIG. 2) radiates (into space) signals from the base station processing device 13, typically several of them frequency multiplexed by a multiplexer in the MUX/DE-MUX 15, after up conversion to a higher spectral band by a Q/V-band interface 16 for reasons of spectrum availability and antenna size.

In space, these signals are received by satellite equipment (see FIG. 3), down-converted to a baseband signal by a Q/V-band interface 26, de-multiplexed by a de-multiplexer in the MUX/DE-MUX compensator 25, up-converted to the original mobile spectrum and relayed by a transmitter/receiver 27 to User Equipment on earth, over a wide field-of-view (FoV) mimicking coverage of a wide area base station.

SUMMARY

In such cases, ensuring signal frequency accuracy becomes quite challenging, due to the difference in frequencies of earth station clock source 14 and satellite equipment clock source 24, and the Doppler effect due to motion of non-geostationary satellite relative to the earth station. Although these can be addressed to some extent using highly accurate stable clocks and Doppler compensation of signals, the uncorrected error in frequency, due to error in predicting satellite position (and motion) and short term (in)stability of clock oscillators, can easily exceed the allowed error (currently +/0.05 ppm for wide area base stations). For example, the '266 Patent discloses that the array 300 forms multiple beams, and each beam is pre-compensated 25 based on satellite ephemeris and beam-center latitude-longitude, for the Doppler frequency shift induced by the satellite.

The radio communication link between earth station and satellite usually carries a signal that is meant for monitoring and control (M&C) of satellite's sub-systems, in addition to carrying the transmit signals to be relayed via satellite to user equipment (UE) and the signals from UE received via the satellite.

DETAILED DESCRIPTION

Figure 1A:
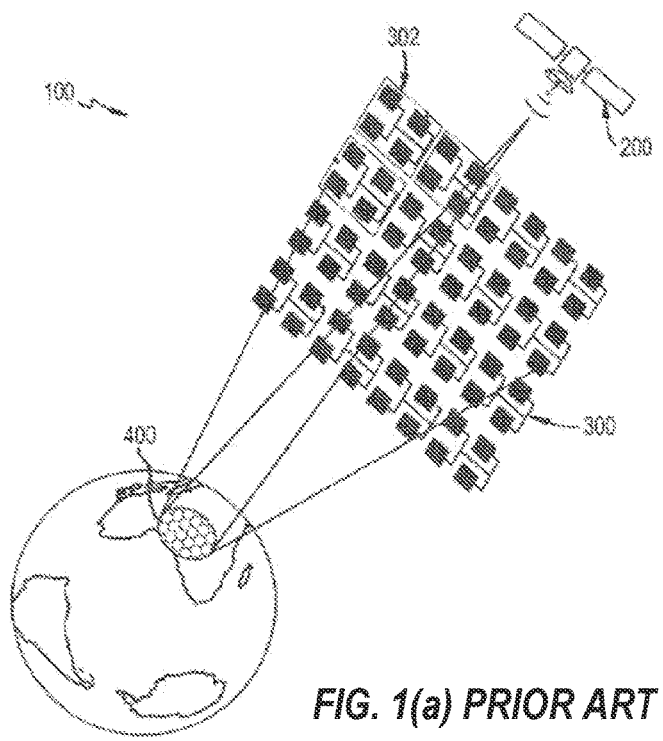
FIGS. 1(a), 1(b) show a known phased array.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings.

Figure 2:
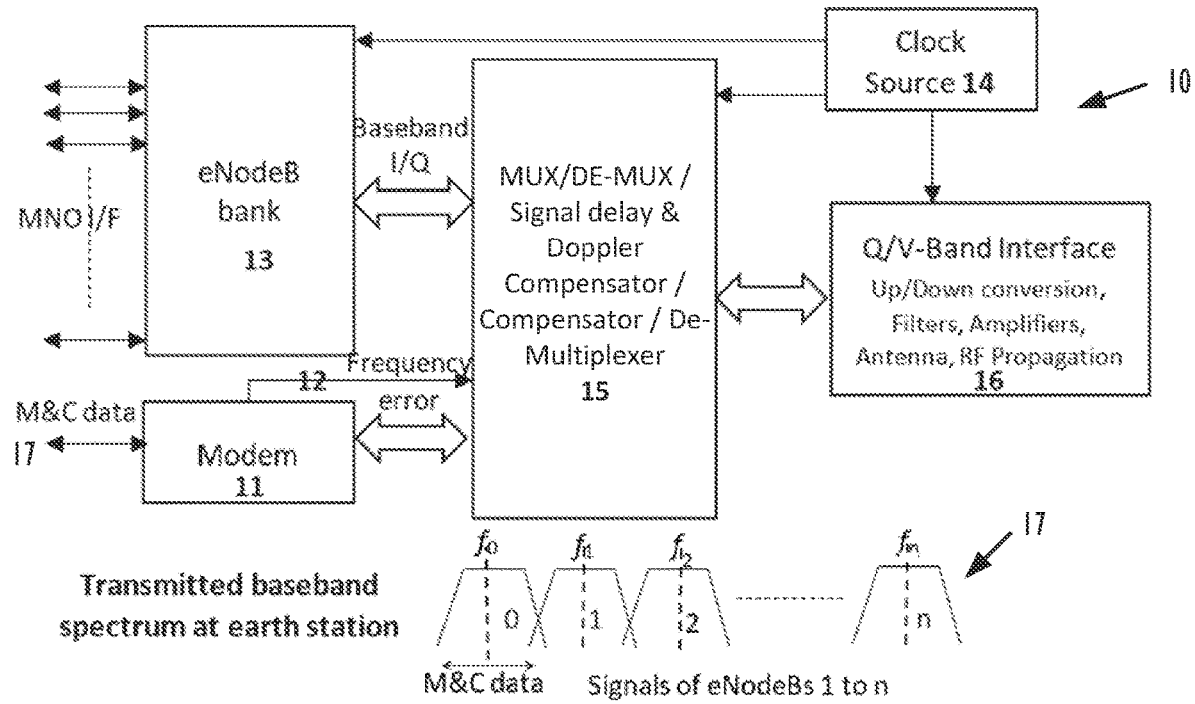
FIG. 2 is a block diagram of one embodiment of the disclosure showing the Earth station equipment and transmitted baseband spectrum.
Figure 3:
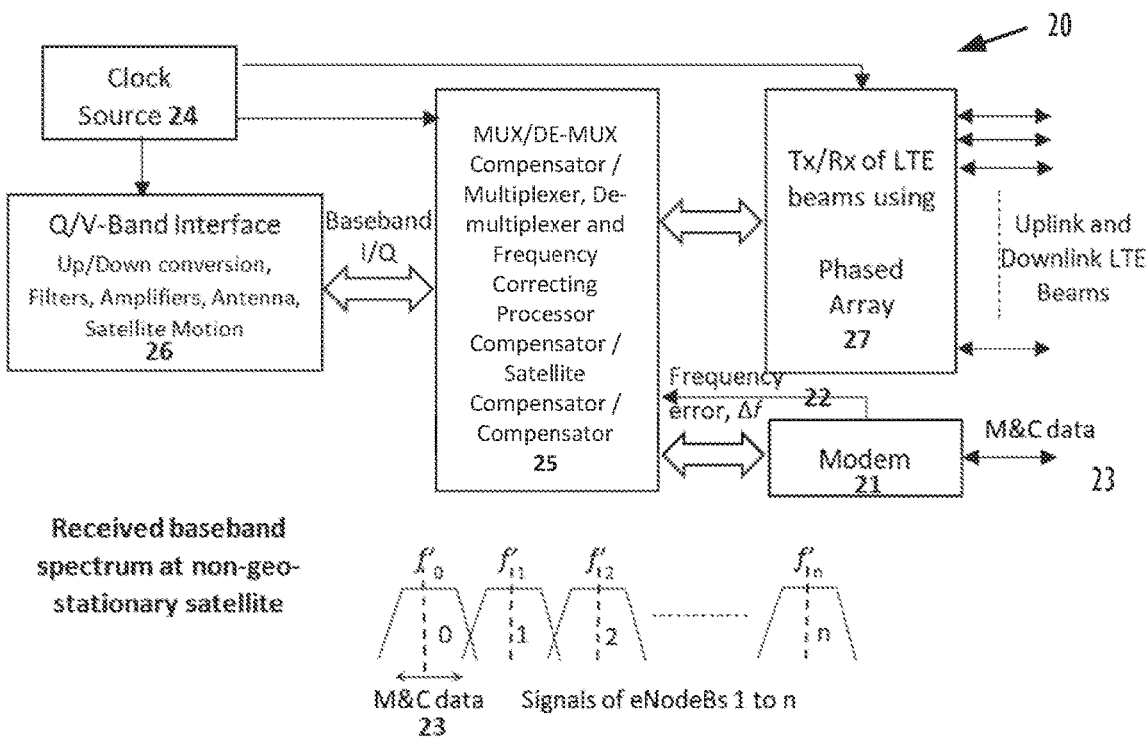
FIG. 3 is a block diagram of one embodiment of the disclosure showing the non-geo-stationary satellite equipment and received baseband spectrum.

Referring to the drawings, FIGS. 2, 3 show a system and method in accordance with one non-limiting illustrative embodiment of the present disclosure. FIG. 2 shows a ground station having a ground station system that includes a base station (similar to that used at a cell tower) processing device 13, signal delay and Doppler compensator 15, a Q/V-band interface 16, stable clock source 14, and modem 11. The processing device 13, such as an eNodeB or bank of eNodeBs, communicates signals with the compensator 15, and then to the interface 16. The eNodeB 13 transmit signals to the compensator 15, which provides delay and Doppler compensation and has a multiplexer to combine signals. The compensated signals are then up-converted at the interface 16, and transmitted to the satellite. A clock source 14 is in communication with the eNodeB 13, compensator 15, and interface 16 and provides a stable and accurate clocking signal to drive operation of the eNodeB 13, compensator 15, and interface 16.

The satellite equipment (FIG. 3) has a satellite system that includes a Q/V-band interface 26, multiplexer, de-multiplexer and frequency correcting processor compensator 25, transceiver Tx/Rx 27, and modem 21. Signals from the ground station are down-converted at the interface 26, and de-multiplexed at the satellite compensator 25. The transceiver 27 relays the frequency corrected signals to User Equipment (e.g., mobile devices such as smart phones) on earth, over a wide field-of-view (FoV) mimicking coverage of a wide area base station. A clock source 24 is in communication with the interface 26, satellite compensator 25, and transceiver 27 and provides a clocking signal to drive operation of the interface 26, compensator 25, and transceiver 27. In the return (up-link) path, the signals from End Users 500 are received by the transceiver 27, multiplexed in the compensator 25 and retransmitted via the interface 26 to the gateway.

At the satellite system, the satellite modem 21 is connected to the satellite compensator 25. The satellite modem 21 receives monitor & control (M&C) data 23, from the Mux-Demux of the compensator 25 part of the ground station provides a frequency error 22 to the frequency shifter in the satellite compensator 25. The M&C data 23 can include data such as the number of beams, beam frequencies, spectral allocation, bandwidth, etc., and can be obtained from a control center, the eNodeB 13 or compensator 15. The frequency error is caused due to the relative frequency error in the clock sources 14, 24 at the gateway and the satellite and error in predicting the location and dynamics of the satellite (resulting in inaccurate compensation of Doppler frequency at the gateway). The satellite system leverages the carrier offset detection capability of the demodulator contained in the on-board modem 21 of M&C channel 23. The modem 21 detects the frequency error $\Delta f$ 22, the difference between the expected (based on the spectral allocation of M&C channel) and the observed frequency at the satellite, introduced in the signal path from the output of the base station 13 at ground to the output of baseband conversion 26 on the satellite, by analyzing the baseband signal, using carrier frequency estimation capability of the demodulator part of the modem, at the baseband conversion 26 to estimate the received carrier $f_c$ on the M&C channel 23 and subtracting it the from the expected frequency ($f_c$) on the M&C channel 23. The purpose is to similarly correct the frequency error in the downlink beam signals.

Figure 1B:
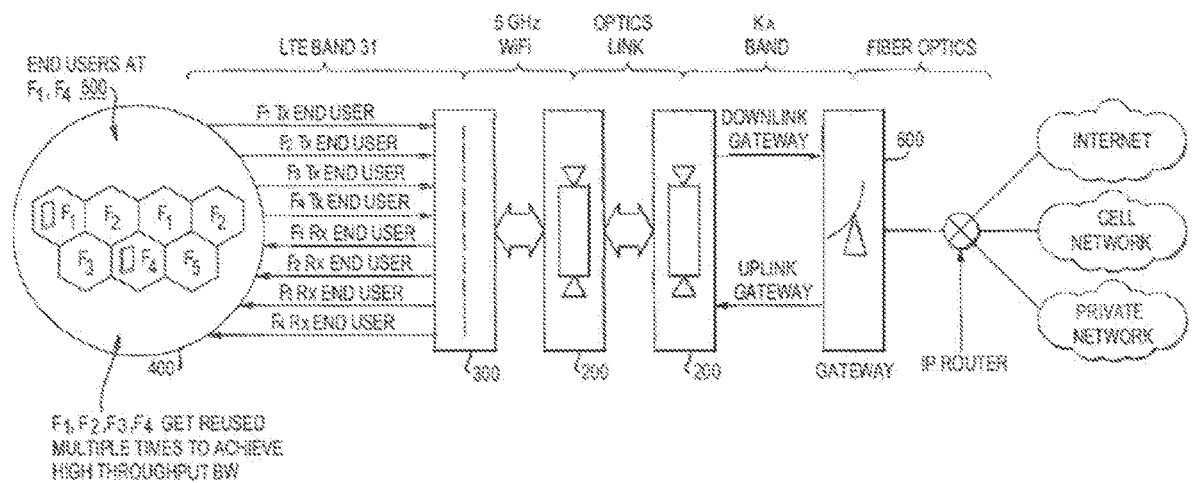

The de-multiplexer of the compensator 25, after separating signals for each of the downlink beams, applies a frequency shift that is equal to negative of the $\Delta f$, before sending them for conversion to LTE band in the phased array 27 (e.g., a digital phased array) and radiating the signals to User Equipment (UE) on the ground. The phased array 27 can be, for example, a phased array as shown in FIG. 1 and disclosed in U.S. Pat. No. 9,973,266, having a plurality of small satellites and a control satellite.

Likewise, in the reverse direction, the ground station modem 11 receives M&C channel data from control satellite via the interfaces 16 and 15. The demodulator inside the earth station hosted modem 11 of M&C channel estimates the frequency error 12 in the M&C channel, by analyzing the baseband signal at the MUX/DE-MUX 15 to estimate the received carrier $f_c$ and subtracting it the from the expected frequency ($f_c$). The expected frequency is known from the M&C data. The de-multiplexer 15, after separating the signals received from each beam, applies a frequency shift equal to negative of the $\Delta f$, before sending them to the eNodeBs 13 (the base-station side of usual terrestrial link). Thus, the base station and UE receive signals, at their respective inputs, with same frequency accuracy as they would receive in a usual 3GPP standards compliant terrestrial cellular network.

The frequency error (in both directions, ground to satellite and satellite to ground) of the carrier signal violates the 3GPP standard and may cause degradation or disruption in the communication. The frequency error occurs due to two main contributing factors. The received carrier frequency, $f'_i = f_i + \Delta f$, for i=0 . . . n, where, $\Delta f$ is the frequency offset, due to sum of: (a) the difference in clock source 14 used in up/down conversions at earth station and the clock source 24 used for up/down conversion at satellite; and (b) residual Doppler after Doppler compensation in the compensator 15 at the earth station. The carrier frequency $f_i$ is the carrier frequency of the $i^{th}$ signal to be sent to UE. The carrier frequency $f_i$ needs to be corrected based on the error detected in $f_c$. As the satellite moves in orbit, the ground station will have a varying delay in the signals which results in Doppler shift. The system pre-compensates the signals that are transmitted to the satellite by shifting the signals in time and frequency to account for delay and Doppler based on predicting where the satellite will be. However, there could be residual error when the signal reaches the satellite. Thus, the Doppler compensation is based on predicted Doppler, but the prediction can be inaccurate leaving a residual error that is detected by the demodulator at the modem 11. In one embodiment, the frequency correction is in addition to the delay and Doppler correction and occurs after the delay and Doppler correction.

The $\Delta f$ is the same for the M&C channel and the eNodeB/UE carriers. Accordingly, once it is estimated by the M&C demodulator on the satellite/ground station, it is used to correct the center frequencies of all base station signals received from eNodeBs on ground or signals from UEs received via satellite. The error can be different in each direction, gateway-to-satellite or satellite-to-gateway.

Figure 4:
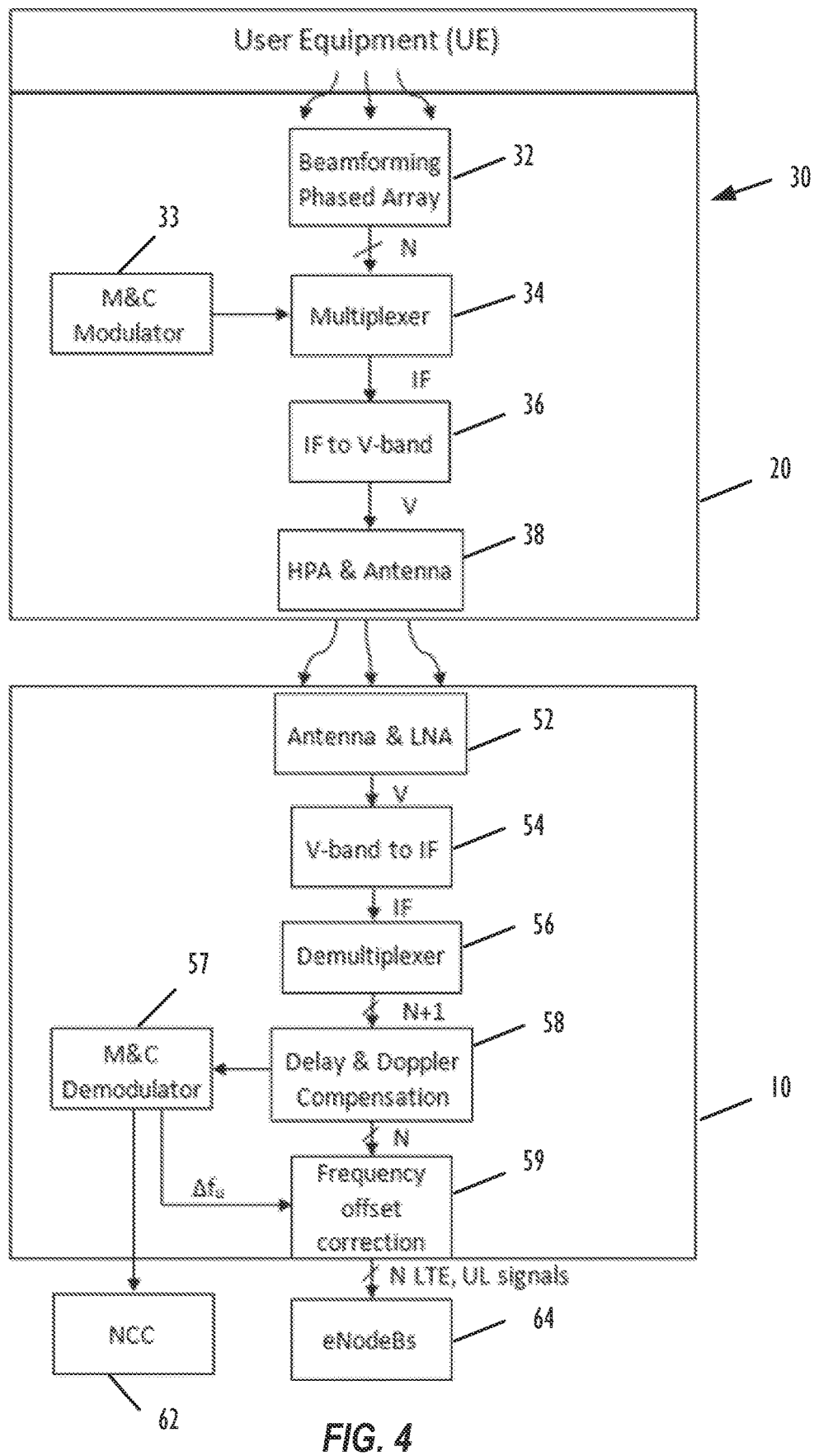
FIG. 4 is a flow diagram showing the up-link signal flow from the UE to the eNodeBs.
Figure 5:
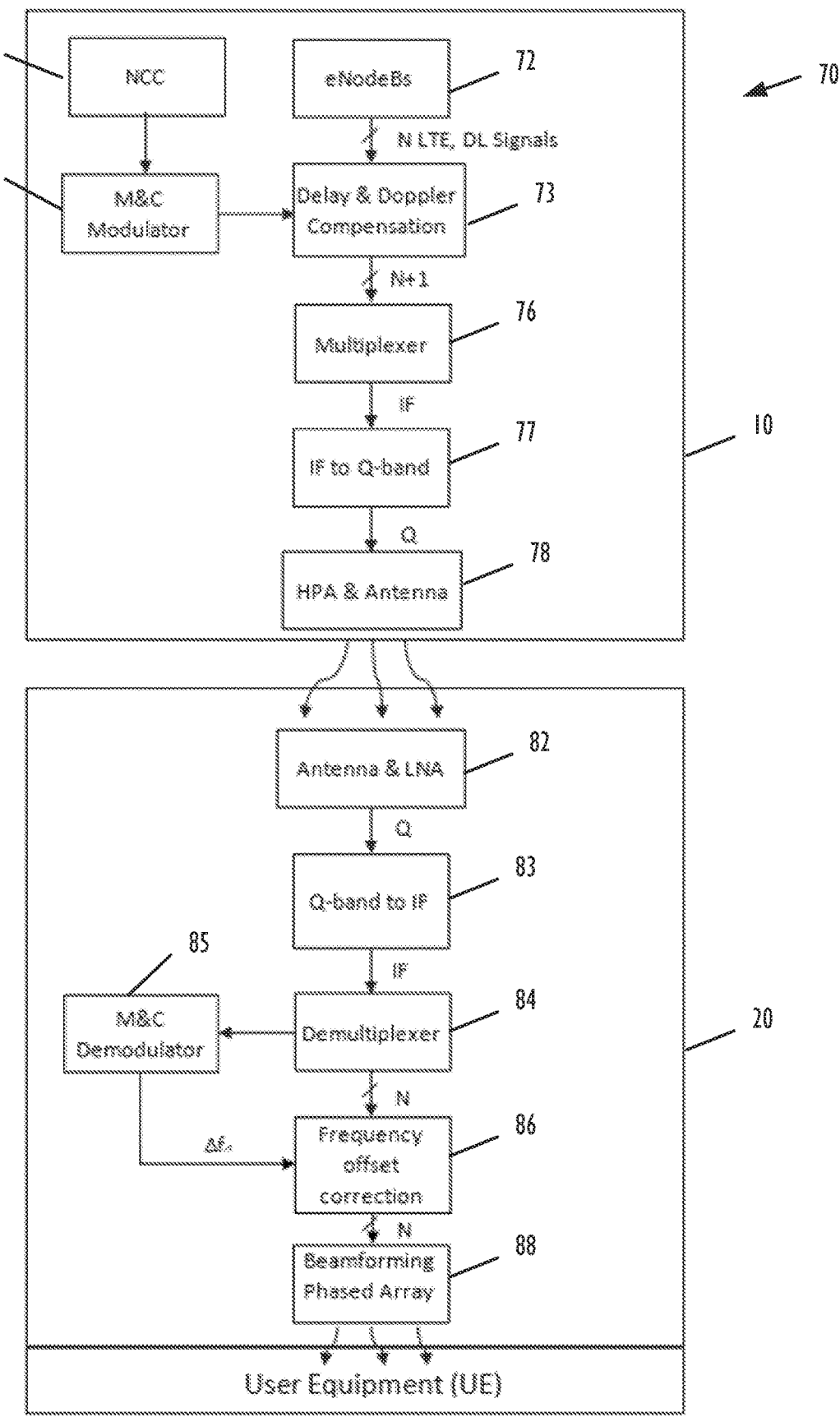
FIG. 5 is a flow diagram showing the downlink signal flow from the eNodeBs to the UE.

Referring to the drawings, FIGS. 4, 5 show the process explained above in the form of signal flow diagrams for the Uplink 30 and Downlink 70 Signal paths, respectively. Referring to FIGS. 3, 4, the uplink operation 30 begins at step 32, where the satellite equipment, e.g., a beamforming phased array 27, forms beams and collects the uplink signals from User Equipment. These are multiplexed, step 34, by the multiplexer of the compensator 25 along with the M&C signal from the modulator, step 33, of the modem 21 at an intermediate frequency IF and up-converted by the interface 26 to V-band frequency, step 36, and amplified and radiated by HPA and antennas, step 38, towards the Gateway.

Now referring to FIGS. 2, 4, the interface 16 of the gateway equipment 10 having the Antenna and Low Noise Amplifier (LNA), collects the signals, step 52, that were radiated from the satellite interface 26 at step 38, for down-conversion from V-band to IF frequency, step 54. Then the compensator 15 de-multiplexes the uplink signals and M&C signal, step 56, and compensates for delay and Doppler variations, step 58. The M&C signal is received from the satellite 20 (step 33). The M&C signal is sent to the demodulator of the modem 11, step 57, for carrier offset or frequency error $\Delta f_u$ estimation (e.g., depending on the spectral analysis resolution, this can be a fraction of one percent). The uplink signals are then corrected for the estimated frequency error determined based on the M&C signal, step 59, by the compensator 15, before they are sent to eNodeBs 13, step 64, for processing of the uplink signals originated at User Equipment (UE).

The downlink signal operation is shown in FIGS. 2, 5. Here, the gateway equipment 10 comprising the eNodeBs 13, step 72, provide the downlink signals for the UE. In parallel, the M&C data is sent from Network Control Center, step 74, for modulation, step 75, by the modulator of the modem 11. The compensator 15 compensates the uplink signals and the M&C signal for delay and Doppler variations, step 73. The multiplexor of the compensator 15 then multiplexes, step 76, the signals to an intermediate frequency (IF). Then the interface 16 up-converts the signals to Q-band frequency, step 77, and amplifies and radiates the signals towards the satellite by HPA and antenna, step 78.

The satellite equipment 20 has an antenna and LNA to receive the signals radiated by the interface 16 at step 78. The phased array converts the Q-band signals to IF, step 83. The signals are de-multiplexed, step 84, by the de-multiplexer of the compensator 25. The M&C signal is received from the ground station 10 (step 75) is then fed to the demodulator of the modem 21, step 85 for carrier offset or frequency error $\Delta f_d$ 22 estimation (e.g., depending on the spectral analysis resolution, this can be a fraction of one percent). Then, at the compensator 25, the downlink signals are compensated for delay and Doppler, then corrected for the estimated frequency error in the monitor and control signal, step 86, before being radiated by the beamforming phased array 27, step 88 to the UE.

The system can also be used in other communication systems in which several channels are multiplexed and communicated over a common radio link to correct the frequency errors in the signals at the receiver, by analyzing baseband signal of just one of the channels and estimating the its frequency error which is common to all channels.

In the embodiments shown, the small satellites 302 and/or the central satellite 200 can include a processing device or processing components to perform various functions and operations in accordance with the present disclosure, such as the operation shown in FIGS. 4, 5. In addition, the ground station has a processing device 13 and processing components and the satellite has processing components and can have a processing device. The processing devices can be, for instance, a computing device, processor, application specific integrated circuits (ASIC), or controller. The processing device can be provided with one or more of a wide variety of components or subsystems including, for example, wired or wireless communication links, and/or storage device(s) such as analog or digital memory or a database. All or parts of the system, processes, and/or data utilized in the system and method disclosed can be stored on or read from the storage device. The processing device can execute software that can be stored on the storage device. Unless indicated otherwise, the process is preferably implemented in automatically by the processor substantially in real time without delay.

It is further noted that in the embodiment of FIGS. 2-3, the system has a demodulator to determine frequency error, and the compensator to apply the error correction to received signals. However, any suitable components can be provided for determining frequency error, such as for example a comparator, and to apply an error correction, such as for example a subtractor. It is further noted that the system has standard processing communication components, such as the Q/V band interface, eNodeB, multiplexer and a de-multiplexer. It should be apparent that any suitable components can be utilized, and that those components and operation need not be utilized. For example, frequency error estimation can be conducted in a system that does not include a multiplexer, de-multiplexer, or Q/V band interface.

The foregoing description and drawings should be considered as illustrative only of the principles of the disclosure, which may be configured in a variety of ways and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A communication ground station comprising:
   an antenna configured to receive a signal and a monitor and control signal, wherein the monitor and control signal is comprised of communication traffics from one or more of a number of beams and the monitor and control signal is further comprised of beam frequency assignment, spectral allocation, and bandwidth;
   a de-multiplexer configured to de-multiplex the signal by applying a frequency shift equal to a negative of a frequency offset of the signal and the monitor and control signal to provide a de-multiplexed signal and a de-multiplexed monitor and control signal;
   a compensator configured to compensate the de-multiplexed signal and the de-multiplexed monitor and control signal for delay and Doppler variations to provide a delay and Doppler compensated signal and a delay and Doppler compensated monitor and control signal; and
   a modem having a demodulator configured to receive the delay and Doppler compensated monitor and control signal, said demodulator configured to determine a residual frequency error in the delay and Doppler compensated monitor and control signal by estimating a received carrier frequency from the monitor and control signal and subtracting it from an expected frequency determined from the monitor and control signal; and
   said compensator further configured to compensate the delay and Doppler compensated signal for the residual frequency error to provide a frequency error compensated signal.

2. The ground station of claim 1, further comprising a processing device configured to process the compensated signal.

3. The ground station of claim 2, wherein said processing device comprises an eNodeB.

4. The ground station of claim 1, wherein the signal comprises an uplink signal.

5. The ground station of claim 1, wherein said demodulator is configured to determine the residual frequency error by determining a frequency offset for a carrier signal of the delay and Doppler compensated monitor and control signal.

6. The ground station of claim 1, wherein said demodulator is configured to determine the residual frequency error by subtracting an expected frequency of the delay and Doppler compensated monitor and control signal, from a received carrier frequency of the delay and Doppler compensated monitor and control signal.

7. The ground station of claim 6, said demodulator configured to determine the received carrier frequency.

8. The ground station of claim 1, said antenna configured to receive the signal from a user equipment via satellite.

9. The communication ground station of claim 1, wherein the signal and the monitor and control signal each have a different carrier frequency.

10. A communication ground station comprising:
    an antenna configured to receive a signal and a monitor and control signal, wherein the monitor and control signal is comprised of communication traffics from one or more of a number of beams and the monitor and control signal is further comprised of beam frequency assignment, spectral allocation, and bandwidth;
    a de-multiplexer configured to de-multiplex the signal by applying a frequency shift equal to a negative of a frequency offset of the signal;
    a demodulator configured to determine a residual frequency error in the monitor and control signal; and a compensator configured to compensate the signal for the residual frequency error to provide a frequency error compensated signal.

11. The ground station of claim 10, wherein said demodulator is configured to determine the residual frequency error by determining a frequency offset for a carrier signal of the monitor and control signal.

12. The ground station of claim 10, wherein said demodulator is configured to determine the residual frequency error by subtracting an expected frequency of the monitor and control signal, from a received carrier frequency of the monitor and control signal.

13. The ground station of claim 12, said demodulator configured to determine the received carrier frequency.

14. The communication ground station of claim 10, wherein the signal and the monitor and control signal each have a different carrier frequency.

15. A communication satellite system comprising:
a receive antenna on satellite configured to receive a signal and a monitor and control signal from a ground station, wherein the signal consists of communications traffics to one or more of a number of user beams and the monitor and control signal is comprised of beam frequency assignment, spectral allocation, and bandwidth;
a de-multiplexer configured to de-multiplex the signal and the monitor and control signal to provide a de-multiplexed signal and a de-multiplexed monitor and control signal;
a modem having a demodulator configured to receive the de-multiplexed monitor and control signal, said demodulator configured to determine a residual frequency error in the de-multiplexed monitor and control signal by estimating a received carrier frequency from the monitor and control signal and subtracting it from an expected frequency determined from the monitor and control signal; and
a compensator configured to compensate the de-multiplexed signal for the residual frequency error to provide a frequency error compensated signal.

16. The system of claim 15, further comprising a transmit antenna configured to transmit the corrected signal to a user equipment.

17. The system of claim 16, said transmit antenna comprising a phased array.

18. The system of claim 15, wherein said demodulator is configured to determine the residual frequency error by determining a frequency offset for a carrier signal of the delay and Doppler compensated monitor and control signal.

19. The system of claim 15, wherein said demodulator is configured to determine the residual frequency error by subtracting an expected frequency of the delay and Doppler compensated monitor and control signal, from a received carrier frequency of the delay and Doppler compensated monitor and control signal.

20. The system of claim 19, said demodulator configured to determine the received carrier frequency.

21. The system of claim 15, wherein said communication system comprises a satellite system.

22. The communication system of claim 15, wherein the signal and the monitor and control signal each have a different carrier frequency.

* * * * *